US 6,459,879 B1

(12) United States Patent
Naruse (10) Patent No.: US 6,459,879 B1
(45) Date of Patent: *Oct. 1, 2002

(54) ORIGINAL DOCUMENT PROCESSING APPARATUS AND IMAGE FORMING APPARATUS

(75) Inventor: Haruo Naruse, Moriya-machi (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/511,903

(22) Filed: Feb. 23, 2000

(30) Foreign Application Priority Data

Feb. 23, 1999 (JP) .......................................... 11-044143

(51) Int. Cl.$^7$ ............................................... G03G 15/00
(52) U.S. Cl. ........................ 399/367; 399/373; 399/374; 271/291
(58) Field of Search ................................ 399/367, 361, 399/365, 368, 369, 372, 373, 374, 17; 271/4.7, 186, 291, 902

(56) References Cited

U.S. PATENT DOCUMENTS 5,669,056 A * 9/1997 Rubscha ..................... 399/367
5,887,865 A * 3/1999 Ishimaru ..................... 271/4.7
5,991,592 A * 11/1999 Kobayashi et al. ......... 399/374
6,037,927 A * 6/2000 Sako et al. .................. 399/374
6,081,688 A * 6/2000 Okada et al. ................ 399/374

* cited by examiner

Primary Examiner—Sophia S. Chen
Assistant Examiner—Hoan Tran
(74) Attorney, Agent, or Firm—Fitzpatrick, Cella, Harper & Scinto (57) ABSTRACT

The present invention relates to an original document processing apparatus for conveying and delivering mounted original documents to a prescribed position that includes a conveyance section, an original document delivery section and a reverse-delivery section having a reverse path for looping and reversing the original document conveyed from the conveyance section to return the original document to the conveyance section, a first conveyance path route leading from the conveyance section through the reverse path to the conveyance section, a second conveyance path route branching at midway of the first conveyance path route to the original document delivery section, a third conveyance path route leading from the conveyance section to the original document delivery section. The reverse-delivery section has a first deflector for selectively introducing the original document conveyed from the conveyance section to the first conveyance path route and the third conveyance path route.

24 Claims, 5 Drawing Sheets

ORIGINAL DOCUMENT PROCESSING APPARATUS AND IMAGE FORMING APPARATUS

BACKGROUND OF THE INVENTION

1. Field of the Invention

This invention relates to an original document processing apparatus for conveying mounted original documents to a prescribed position to deliver the documents and to an image forming apparatus having the original document processing apparatus.

2. Description of Related Art

Photocopies, scanners or the like produced currently typically include an original document processing apparatus, or an automatic document feeder (ADF) for separately feeding the original documents automatically sheet by sheet where the original documents in a plural number are set. In such an original document processing apparatus, original documents are mounted on an original document tray and are separately fed sheet by sheet, and the documents are also conveyed with an original document conveyance section made up of conveyance belts to a prescribed position on a platen glass where a reading apparatus reads the original document images. After the images are read, the original documents are conveyed to an original document delivering section with the conveyance belts thus to be delivered to an original document delivering tray or the like of the original document delivering section.

Some of the above-mentioned original document processing apparatuses are designed to deliver the original documents in the page sequence in a manner of reversing the side of the sheets when original documents in a plural number are sequentially read and delivered.

In order to reverse the side of the original documents, however, conveyance paths become complicated and multiple flappers are required to control the feedings of the original documents. Switching operation of the solenoids for operating flappers therefore become complicated, and conveyance of the original document has to be stopped during the time of switching the solenoids. Furthermore, solenoid ability tends to be lowered by considerable heating-up caused by high solenoid absorption duty.

As a conveyance pass for reversing the side of the original document becomes long, the time required for conveying, reading, and delivering the original documents becomes long, and, in some cases, this further requires many members such as conveyance rollers or the like, thus making the apparatus larger.

This invention is made in view of the above respects, and the purpose of the invention is to provide an original document processing apparatus allowing a conveyance path for delivering original documents in a manner of reversing the side of the sheet to become short and allowing deflection means such as flappers or the like in a fewer number, thus to make the apparatus as a whole smaller, and an image forming apparatus having the original document processing apparatus.

SUMMARY OF THE INVENTION

A representative structure of the invention to accomplish the above objects is to structure an original document processing apparatus for conveying the mounted original documents to a prescribed position to deliver the original documents, the original document processing apparatus including a conveyance section for conveying the original document to the prescribed position, an original document delivery section for delivering the original document, a reverse-deliver section having a reverse path for looping and reversing the original document conveyed from the conveyance section to return the original document back to the conveyance section, a first conveyance path route leading from the conveyance section through the reverse path to the conveyance section, a second conveyance path route branching at a midway of the first conveyance path route to the original document delivery section, a third conveyance path route leading from the conveyance section to the original document delivery section, and a first deflection means for introducing the original documents conveyed from the conveyance section selectively to the first conveyance path route or the third conveyance path route.

According to the above structure, the original document processing apparatus having a reverse section in an original document delivery part can introduce the original document to the original document delivery section by selectively switching back the original documents with the use of the second route, and therefore original document processing speed can be improved in comparison with the case where the original documents are once brought back to the conveyance section before sent to the original document delivery section. One deflection means can selectively bring the original document to be conveyed to the reverse-delivery section from the conveyance section to the reverse path or the third conveyance path route, and the original documents not to be reversed or those once returned to the conveyance section can be introduced to the original document delivery section.

Other structure is to structure an original document processing apparatus for conveying the mounted original documents to a prescribed position to deliver those documents, including a conveyance section for conveying the original document to the prescribed position, an original document delivery section for delivering the original document, and a reverse-delivery section having a reverse path for looping and reversing the original documents conveyed from the conveyance section to return the original document to the conveyance section, a first conveyance path route leading from the conveyance section through the reverse path to the conveyance section, a second conveyance path route branching at a midway of the first conveyance path route to the original document delivery section by crossing over the first conveyance path route, and a third conveyance path route leading from the conveyance section to the original document delivery section.

With the above structure, a distance for conveying the original document can be shortened since the second conveyance path route crosses over the first conveyance path route, thus making the structure of the original document delivery section more compact.

In addition, the size of the original document delivery section can be made small by making the length of the reverse path shorter than that of the maximum length of original documents able to be processed according to the structure.

The original document processing apparatus conveying the set original documents to the prescribed position includes a conveyance section for conveying the original document to a prescribed position, an original document delivery section for delivering the original documents, and a reverse-delivery section having a reverse path, with the shorter length than that of the maximum length of the original documents able to be processed, for looping and reversing the original documents conveyed from the conveyance section to return the documents to the conveyance section, a first conveyance path route leading from the conveyance section through the reverse path to the conveyance section, a second conveyance path route branching at a midway of the first conveyance path route to the original document delivery section by crossing over the first conveyance path route, and a third conveyance path route leading from the conveyance section to the original document delivery section where the following structures may be made in which the original document is switched back on the first conveyance path route to be delivered to the original document delivery section through the second conveyance path route when the length of the original document to be conveyed is shorter than that of the reverse path as well as the original document is returned to the conveyance section on the first conveyance path route to be delivered through the third path route to the original document delivery section.

According to the above structure, reversing operation can be selected according to the length of an original document in reversing the document, and therefore in the case that the length of the original document is shorter than that of the reverse path, operation is selected where the original document is switched back on the reverse path to be delivered to the original document delivery section, thereby shortening the conveyance length of the original document and improving the processing speed of the original document. On the other hand, in the case that the length of the original document is longer than that of the reverse path, another operation is selected where the original document is returned to the conveyance section and then delivered to the original document delivery section, so this provides no requirement for the reverse path to be longer than the length required, making the reverse-delivery section compact.

The reverse-delivery section specifically includes respective paths such as an introduction path for introducing the original document conveyed from the conveyance section, a reverse path for looping and reversing the original document passed through the introduction path, a delivery path connecting between the conveyance section and the original document delivery section, and a conveyance path branching at a midway of the reverse path leading to the original document delivery section, where the first deflection means selecting the introduction path or the delivery path can be provided. In this case, the conveyance path can convey the original document switched back on the reverse path to the original document delivery section.

DESCRIPTION OF PREFERRED EMBODIMENTS

Figure 1:
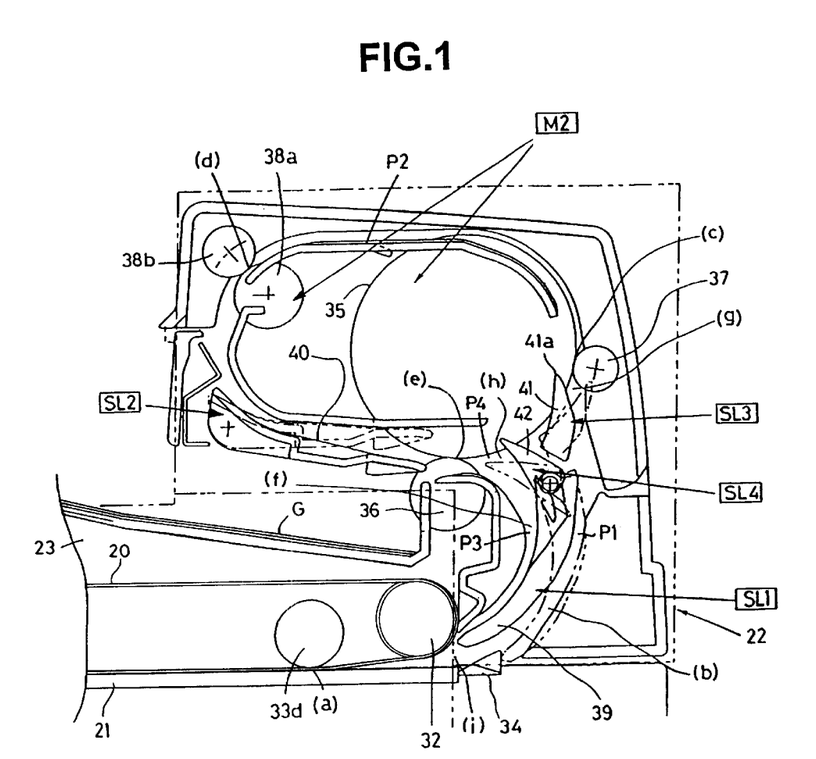
FIG. 1 is an illustration of original document conveyance paths of a reverse-deliver section.
Figure 2:
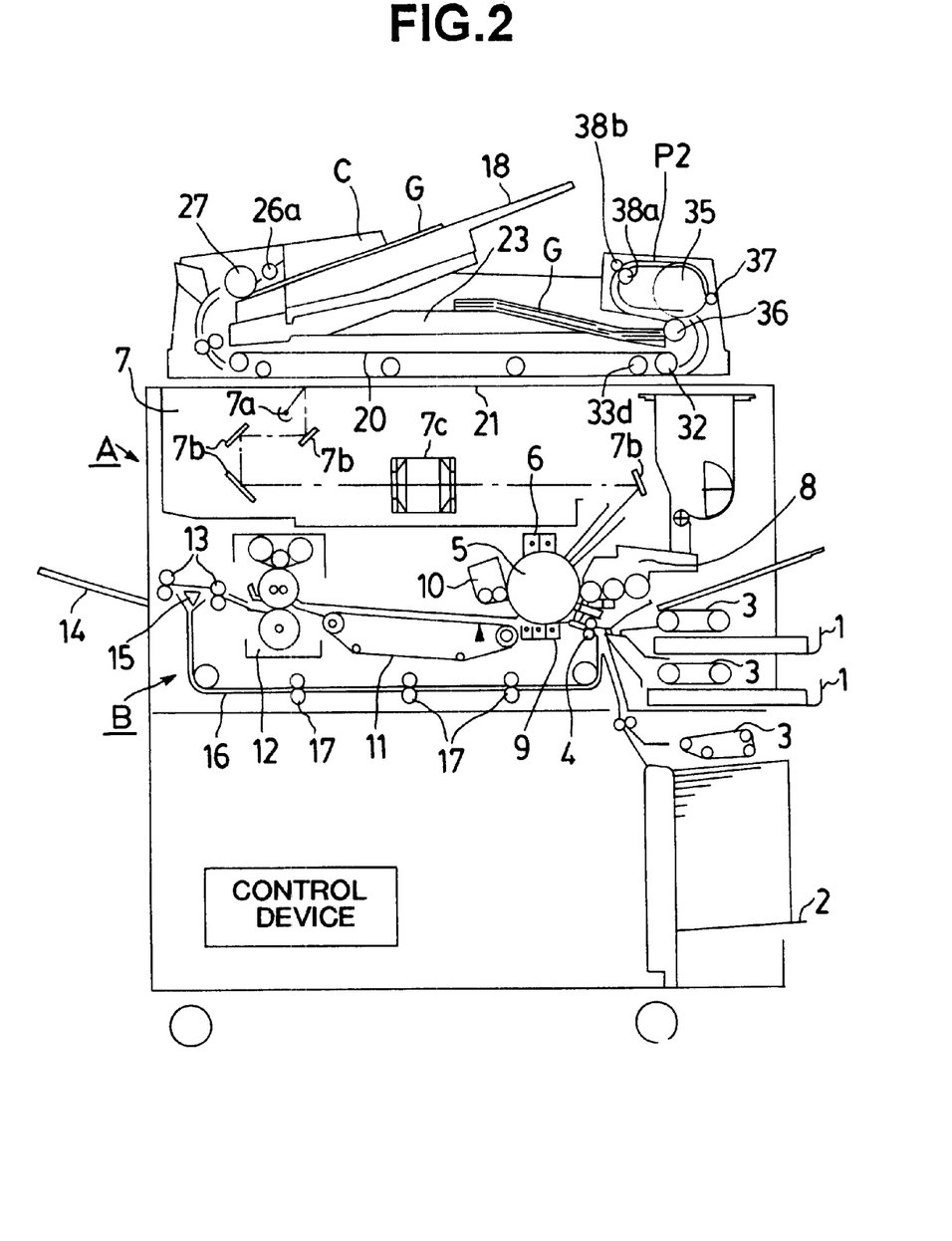
FIG. 2 is a cross-sectional illustration of an image forming apparatus equipped with an original document processing apparatus.
Figure 3:
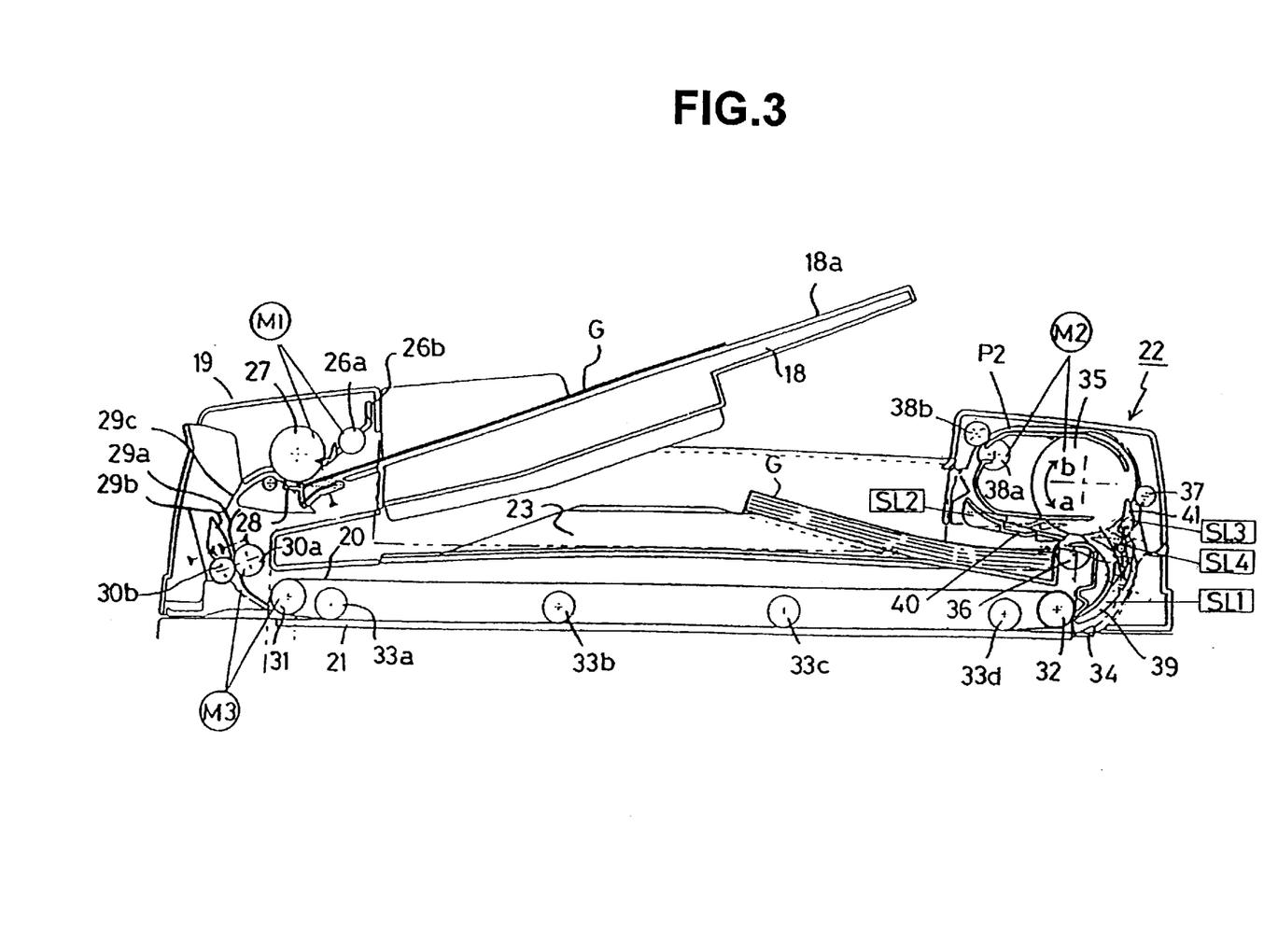
FIG. 3 is a cross-sectional illustration of the original document processing apparatus.
Figure 4:
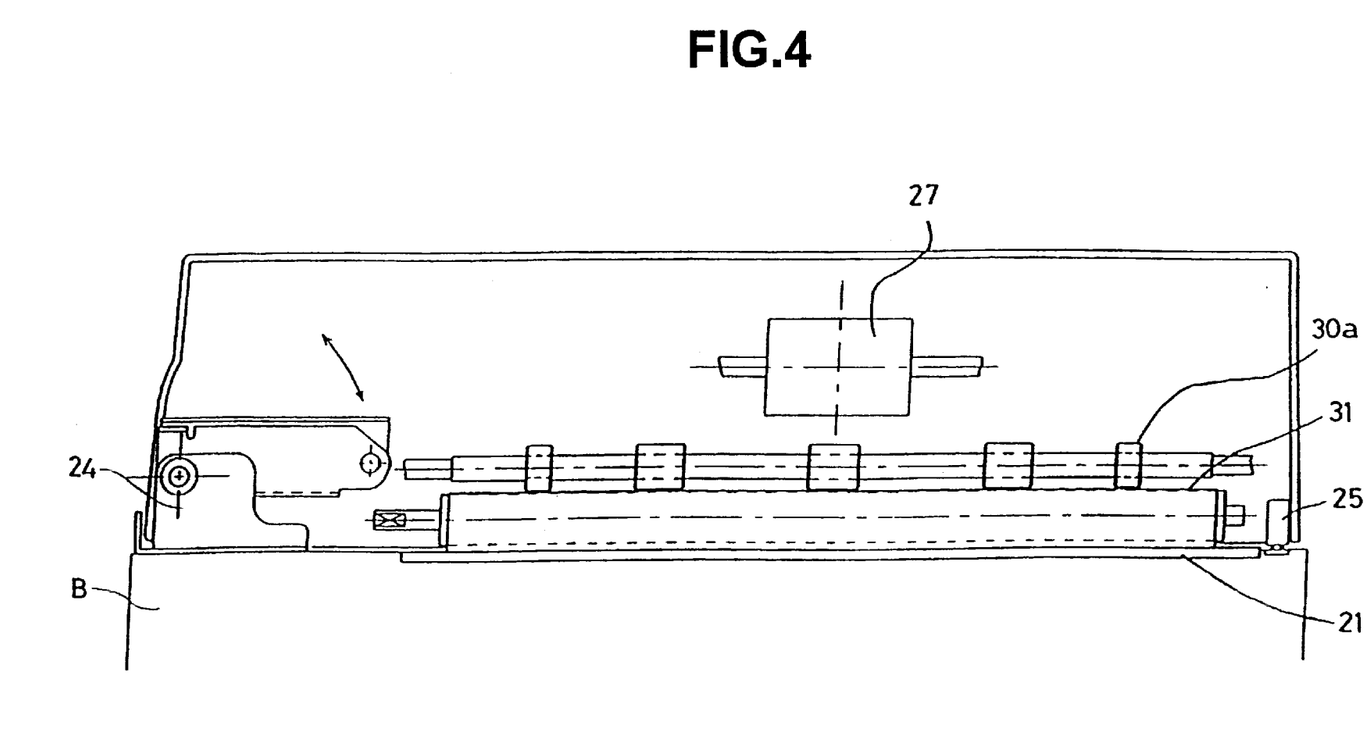
FIG. 4 is a side cross section of the original document processing apparatus.

An image forming apparatus having an original document processing apparatus according to the embodiment of the invention is specifically explained as follows by referring to FIG. 1 through FIG. 4. FIG. 1 is an illustration of original document conveyance paths of a reverse-deliver section. FIG. 2 is a cross-sectional illustration of an image forming apparatus having an original document processing apparatus. FIG. 3 is a cross-sectional illustration of the original document processing apparatus, and FIG. 4 is a side cross section of the original document processing apparatus.

First, the whole structure of the image forming apparatus is to be explained, and then original document conveyance structures of the original document processing apparatus and the reverse-deliver section are to be explained.

[Whole Structure of the Image Forming Apparatus]

As shown in FIG. 2, an image forming apparatus A of the embodiment is so structured to have, on the upper section of the recording apparatus B, an original document processing apparatus C for feeding original documents, and the image forming apparatus A is a photocopy reading the original documents fed with the original document processing apparatus C by using a reading means to record, according to the information, the images on a recording medium by using a recording apparatus B.

The recording apparatus B records images on the recording medium S according to the information to be read. Specifically, the recording media S contained in a sheet cassette 1 or a sheet deck 2 are separately fed sheet by sheet by a feeding belt 3 and are conveyed to an image forming means corresponding to the timing for image formation in correcting obliquely by a register roller 4.

The image forming means of the embodiment forms images in use of an electrophotographic method where processing means are arranged around a photosensitive drum 5. It is briefly explained that information of an original document G conveyed by the original document processing apparatus C to be explained later is read and exposed with a reading method 7 while the surface of the rotatively driving photosensitive drum 5 is uniformly charged with a primary charger 6. In other words, light radiation is made with a light source 7a with respect to the original document G conveyed on the platen glass, and the reflecting lights make image exposures on the photosensitive drum 5 through mirrors 7b, lenses 7c or the like, thus to form electrostatic latent images. This latent images is visualized by toner development using a developing means 8, and the toner images are transferred to a recording medium S conveyed by bias application to a transfer charger 9, thereby making image recording. The toners remained on the photosensitive drum 5 after the toner image transfer are removed by a cleaning means 10.

The recording medium S, after the toner image transfer, is conveyed by a belt member 11 to a fixing means 12 where the toner images are fixed by the heat and pressure application, and delivered by delivery rollers 13 to a delivery tray 14.

When recording is made on both sides of the recording medium S, the medium S is sent from the delivery rollers 13 to a re-sending path 16 by a flapper 15, and then, after reversed in sides by switching back movement, sent with re-sending rollers 17 to the image forming means for recording the reversed side or unread side, thus to be delivered.

[Original Document Processing Apparatus]

Following is a description of the structure of the original document processing apparatus C conveying the original document G to a reading means 7 and delivering, after reading is made, to the deliver section to be explained later.

As shown in FIG. 3, the original document processing apparatus C separately feeds sheet by sheet the original documents G mounted on the original document mounting tray 18 with the use of the original document feeding section 19, and the original documents G are conveyed with a conveyance belt 20 as a original document conveyance section to the prescribed reading position on the platen glass 21. The original document G, after read, is reversed in a reverse-delivery section 22, thus to be delivered to an original document receiving tray 23.

The original document processing apparatus C is attached in a way as to cover the surface of the platen glass 21 mounted on the top portion of the recording apparatus B, and, as shown in FIG. 4, the inner part is secured to the photocopy body by a hinge 24 while the front part is detachably attached to the photocopy body with, for example, a magnet catcher 25.

As shown in FIG. 3, the original document mounting tray 18 is provided on the upper part of the original document processing apparatus C, and to the left side of the original document mounting tray 18, there is provided the original document feeding apparatus 19 feeding separately sheet by sheet the original document bundle mounted on a loading surface 18a so as to face the reading side of the document up. The original document feeding section 19 is to separate the topmost piece from the original document bundle by the friction separating method and to convey the documents by register roller pair 30a, 30b. The original document feeding section 19 is equipped with a feeding roller 26a, a separation roller 27, a pickup plate 26b or the like. By a motor M1, the pickup plate 26b and the feeding roller 26a move down, and the feeding roller 26a and the separation roller 27 rotate, thus to feed the original documents sheet by sheet. Here, the original documents of the second sheet or later which tend to be dragged by the topmost sheet are stopped at the original document mounting tray 18 with a frictional piece 28. After that, the original document is introduced to the register roller pair 30a, 30b by passing among guide plates 29a, 29b, and 29c. The register roller pair 30a, 30b are made stopped when the front end of the original document reaches there, and the original document is fed to the conveyance belt 20 after obliquely corrected by forming a loop with the conveyance by the separation roller 27.

The conveyance section for conveying the fed original document G on to the platen glass 21 is so structured that a conveyance belt 20 is tensioned with a drive roller 31 and a driven roller 32 and pressed by belt pressing rollers 33a, 33b, 33c and 33d to the platen glass 21. The drive roller 31 receives rotary driving from a motor M3, thereby making the conveyance belt 20 rotate. The original document G is conveyed on the platen glass 21 by friction force of the conveyance belt 20 when entering between the conveyance belt 20 and the platen glass 21. When the original document thus entered from the original document feeding section 19 to original document conveyance section is conveyed to the prescribed position on the platen glass 21 by the conveyance belt 20, the original document is made stopped according to stop motion of the motor M3 and read with the reading means 7 (See, FIG. 2).

The original document after read is conveyed on a right side in FIG. 3 by the re-driving of the motor M3, and is then introduced to a reverse-delivery section 22 through a jumping tray 34. Where a subsequent original document exists, the original document is made stopped according to stop motion of the motor M3 and is read by the reading means 7 after the document is conveyed to the prescribed position, by rotation of the conveyance belt 20, in substantially the same manner as the proceeding original document. The proceeding original document during this reading operation is entered to a reverse path P2 by the rotation of the reverse roller 35 in an arrow direction α with the normal rotation of a motor M2, and is reversed, thus to be delivered to the delivery tray 14.

(Reverse-delivery Section)

The reverse-delivery section 22 is to reverse and delivery the original document G after read. As shown in FIG. 1, a driven roller 36 and a driven roller 37 are in pressed contact with a reverse roller 35, and conveyance roller pair 38a, 38b are formed in the reverse path P2. In the reverse-delivery section 22, the motor M2 as a driving source is connected to the reverse roller 35 and the conveyance roller 38a as a conveyance means. The motor M2 is so structured to be rotatable in forwardly and backwardly where the reverse roller 35 and the conveyance roller 38a can be driven independently from the conveyance belt 20 driven by the motor M3 as an original document conveyance section.

The first flapper 39 as the first deflection means to send selectively the conveyed original document by conveyance belt 20 to an introduction path P1 or the delivery path P3, the second flapper 40 as the second deflection means to send selectively the original document from reverse path P2 to delivery path P3 or from the delivery path P3 (or conveyance path P4) to the original document receiving tray 23, the third flapper 41 as the third deflection means to send selectively the original document from the introduction path P1 to the reverse path P2 or from the reverse path P2 to the conveyance path P4, and the fourth flapper 42 as the fourth deflection means pivotally rotating in the same direction as the first flapper for opening and closing the conveyance path P4 are swingably formed by respective solenoids SL1 to SL4.

The reverse-delivery section 22 in this embodiment has, according to the size of the original document, a small size original document delivery mode and a large size original document delivery mode, and it has a double-side reading delivery mode for reading the both sides of the document. The reverse roller 35 and the respective flappers 39 to 42 operate according to the respective delivery mode.

(When the Length of an Original Document is Short)

Herein, the respective original document delivery mode is briefly described by referring to FIG. 1. First, described is a single-sided original document conveyance movement (small size mode) where the original document length of the conveyance direction is shorter than the path length of the reverse path P2.

The front end of the original document G is conveyed to a conveyance nip constituted of the reverse roller 35 and the driven roller 37 of the reverse-delivery section 22 by the conveyance force of the original document conveyance section. Then, the original document conveyance is to be made with the drive by the reverse roller 35 and the conveyance roller 38a.

When the proceeding original document is introduced to the reverse-delivery section 22, the flappers 39, 40 and 41 are switched by respective solenoids SL1, SL2 and SL3 to the position of the continuous line described in FIG. 1, and then the front end of the original document is introduced from (a), to (b), to (c), to (d), to (e), to (f), to (i) and to (a) in this order as shown in FIG. 1. This route or conveyance route is referred as the first conveyance path route passing through the boundary (i) of the conveyance belt 20 as a conveyance section and the reverse-delivery section 22 and leading via the introduction path P1, the reverse path P2, and the delivery path P3 to the boundary (i) in this order.

The rotating direction of the motor M2 is reversed when the rear end of the original document is completely passed through the tip 41a of the flapper 41, thereby switching the conveyance direction of the original document G to the opposite direction (switching back). The flappers 41 and 42 are moved beforehand to the chain double-dashed line as shown in FIG. 1 by the respective solenoids SL3 and SL4. Thus, the original document is introduced passing through (c), (g), (h), and (e) in this order to be delivered to the original document receiving tray 23. Here, the flapper 40 is moved to the chain double-dashed line position by the solenoid SL2 before the front end of the original document is delivered from the (e). The conveyance path branching from the first conveyance to pass the original document through the delivery path P4 by switching back movement and crossing over the reverse path for sending the original document to the original document receiving tray 23 is referred as the second conveyance path route. The above mentioned is a procedure for conveying the single-sided original document of the relatively short original document.

(When the Length of an Original Document is Long)

Next, described is a single-sided original document conveyance movement (large size mode) where the length of the original document G of the conveyance direction is longer than the path length of the reverse path P2.

The front end of the original document G is conveyed to the conveyance nip constituted of the reverse roller 35 and the driven roller 37 of the reverse-delivery section 22 by the conveyance force of the original document conveyance belt 20. Then, the original document conveyance is to be made with the drive of the reverse-delivery section 22.

When the length of the original document G of the conveyance direction is longer than the path length of the reverse path P2, the conveyance operation cannot be worked out if there are subsequent original documents, and therefore this conveyance mode always becomes the original document conveyance where the original document is conveyed sheet by sheet.

When the original document is introduced to the reverse-delivery section 22, the flappers 39, 40 and 41 are switched respectively to the continuous lines shown in FIG. 1 by the solenoid SL1, SL2 and SL3, thereby introducing the front end of the original document from (a) to (b), to (c), to (d), to (e), to (f), to (i), and to (a) in this order, along with the first conveyance path. Here, the rotating direction of the conveyance belt 20 is reversed before the front end of the original document reaches the boundary (i) of the conveyance belt and the reverse-delivery section. In the section from (i) to (a), the front end of the original document is introduced by the conveyance belt 20. Thereafter, the rotating direction of the motor M2 is made to be reversed when the rear end of the original document is completely passed through the nip (e) of the driven roller 36, thereby switching the conveyance direction of the original document G to the opposite direction (switching back). Beforehand, the flapper 40 is to be switched to the chain double-dashed line position show in FIG. 1 by the solenoid SL2. Thus, the rear end of the original document is introduced from (f) to (e) to be delivered to the original document receiving tray 23. The above mentioned is a conveyance procedure of the single-sided original document of the relatively long original document.

Regarding the length of the original document, the definition of long and short can be arbitrary determined, but highly used A4 size (length: approximately 21 cm), for example, can be set as a decision criteria where a switching back process is made on the reverse path P2 when the original document is shorter than that of the criteria and the process for returning the original document from the reverse path P2 to the conveyance section (conveyance belt 22) is made when the original document is longer than that of the criteria. In this case, the length of the reverse path P2 is set as the length of A4 size plus α. The length of the original document to be actually processed can be judged during conveyance with the use of a sensor (not shown) or judged from the image information read by the reading apparatus.

Conveyance of the double-side original document (double-side reading mode) is explained, and the summarized movements of the double-side original document conveyance are described as follows. The original document that has been sent from the original document feeding section 19 to the reading section is, first, subject to the image reading of the first side of the sheet on the reading section by an image reading means 7. The original document after read is conveyed to the reverse-delivery section 22, made to go once around the reverse path P2 along with the first conveyance path, and then returned back to the conveyance belt 20 as an original document conveyance section. By this movement, the original document is mounted on the platen glass 21 with the read side reversed.

Thereafter, the original document is conveyed by the conveyance belt 20 to the prescribed position on the platen glass 21 to be stopped there, and then subject to the image reading of the second side of the sheet, or an unread side of the sheet. After the reading the second side of the sheet is completed, the original document is then delivered, via the delivery path P3 (from (a) to (f) and to (e) in this order shown in FIG. 1) as the third conveyance path route of the reverse-delivery section 22, to the original document receiving tray 23.

The double-side movement is explained as follows referring to FIG. 1. The original document G, after the image reading of the first side of the original document is completed on the platen glass 21, is introduced to the reverse-delivery section 22. Therefore, the flappers 39, 40 41 and 42 are switched beforehand to the respective continuous lines by the solenoids SL1, SL2, SL3, and SL4, thereby introducing the front end of the original document from (a) to (b), to (c), to (d), to (e), to (f), to (i) and to (a) in this order along with the first conveyance path. Here, before the front end of the original document reaches the boundary (i) of the reverse-delivery section 22 and the conveyance belt 20, the rotating direction of the original document conveyance belt 20 is required to be made reversed so as to make it in the same direction as the conveyance direction of the front end of the original document. This is because the conveyance direction of the original document on the platen glass 21 by the original document conveyance belt 20 is changed from the right to the left as shown in FIG. 1. Thus, the original document is conveyed from (i) to (a) by the reverse roller 35 and the conveyance roller pair 38a, 38b, and, from the boundary (i), the front end of the original document is introduced smoothly to the platen glass 21 by the original document conveyance belt 20.

The original document is conveyed to the prescribed reading position, and the second side of the sheet is read on the platen glass 21. The original document is thereafter conveyed toward the reverse-delivery section 22 again by the original document conveyance belt 20. In the reverse-delivery section 22, the solenoids SL1 and SL4 move the flappers 39 and 42 into the chain double-dashed lines to ready for the original document to be entered. As a result, the original document is delivered to the original document receiving tray 23 thorough the third conveyance path route from (a) to (f) and to (e) in this order. Here, before the front end of the original document is delivered from (e), the flapper 40 is moved by the SL2 to the chain double-dashed line. The above mentioned is a conveyance movement of the double-side original document.

Here, it is considerable that the first flapper 39 for sending the original document selectively to the introduction path P1 or the delivery path P3 of the reverse-delivery section 22 is divided and the respective flappers are driven independently by solenoids. In this case, however, the number of the solenoids is increased and the drive duty of the solenoids is made higher, thus causing the considerable heat-up and making the driving control complicated.

In this embodiment as mentioned above, on the other hand, there provides the single first flapper 39 sending selectively to the introduction path P1 or the delivery path P3, and this first flapper 39 is so structured as to be changeable between the first position where the swinging and moving tip is positioned in the approximately upper part of the boundary of the conveyance belt 20 and the reverse-delivery section 22 (a state described with a continuous line in FIG. 1), and the second position locating in lower than that of the first position (a state described with a chain double-dashed line in FIG. 1), and therefore, the original document can be selectively sent to the introduction path P1 or the delivery path P3 by the first flapper 39 alone. This can reduce the number of flappers and the number of the solenoid thus needed to the required minimum number, thereby reducing the number of parts while making the driving control easier.

In the embodiment, there provide the second flapper 40 and the third flapper 41, and, it is so structured that, when the small size original document is delivered, the rear end of the original document is switched back immediately after the rear end of the document is completely passed through the tip of the third flapper 41 to be delivered via the second conveyance path to the original document receiving tray 23, thereby shortening the original document reversing time. Without the second conveyance path, for example, even the small size original document is to be conveyed from (a), to (b), to (c), to (d), to (e), and to (f) in this order as shown in FIG. 1 in the same manner as that of the large size original document, and the second flapper 40 needs to be switched at the time when the rear end of the original document is completely passed through the tip of the second flapper 40 and the reverse roller 35 needs to be reversingly driven for delivering the document to the original document receiving tray 23, thus making the reverse conveyance time longer.

In this case, the front end of the original document to be reversed must not reach to the conveyance belt 20 in order that subsequent original document is read while the proceeding original document is reversed. As a result, the subsequent original document can be continuously sent on the platen glass 21 only when the size of the proceeding original document is within the length from (e) to (f) and to (i), and therefore, the original document size able to be continuously read is highly limited. In order to read continuously even the regular size original documents, the route of the delivery path P3 from the (e), to (f), and to (i) in this order is required to be longer, thereby making the apparatus larger.

In this embodiment, on the other hand, not only that the original document is switched back by the second conveyance path immediately after the rear end of the original document is completely passed through the tip of the third flapper 41, thus to shorten the reversing time, but also that the subsequent original document can be sent on the platen glass 21 as long as the size of the proceeding original document is within the length from (c), to (d), to (e), to (f), and to (i) in this order, and therefore the path for reversing the original document can be obtained in a long length without making the apparatus larger.

[Other Embodiments]

In the above-mentioned embodiment, respective flappers 39 to 42 are swung and moved by the respective solenoids SL1 to SL4 to branch the original documents in the case that the original documents are branched in the reverse-delivery section 22. Other than this, however, branching can be made with a fixing guide by taking advantage of the curvature or the step of the original document path.

The second flapper 40 and the third flapper 41 may be swung and moved by the original document to be conveyed without using solenoids. When the flapper is switched by the solenoid, the switching time affects the original document reverse-delivery time, so systems without extra time for the delivery time may suffers disadvantageously. Particularly in the case that time reduction is to be achieved by continuously reversing the proceeding original documents while the subsequent original documents are read, the flapper switching time must be shorten as far as possible. The switching time is the time for detecting the original document passing completely through the flapper tip, and then sending signals to the driving means such as solenoids or the like, as well as the time during which the flapper starts moving, by the signals, to the switching direction until the flapper finishes moving. For example, when the small size original document is to be reversely delivered according to FIG. 1, the original document is passed through the tip of the third flapper 41 to be conveyed afterward to the opposite direction. In this case, waiting the switching time of the third flapper 41 is required, so it is desirable to reduce the switching time to reduce the original document delivery time.

Figure 5A:
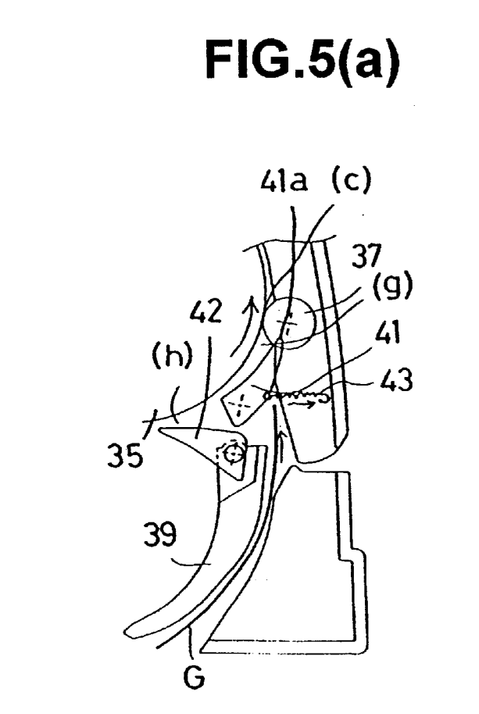
FIGS. 5(a), 5(b) and 5(c) are cross-sectional views of a part of the original document processing apparatus illustrating the third flapper according to another embodiment.
Figure 5B:
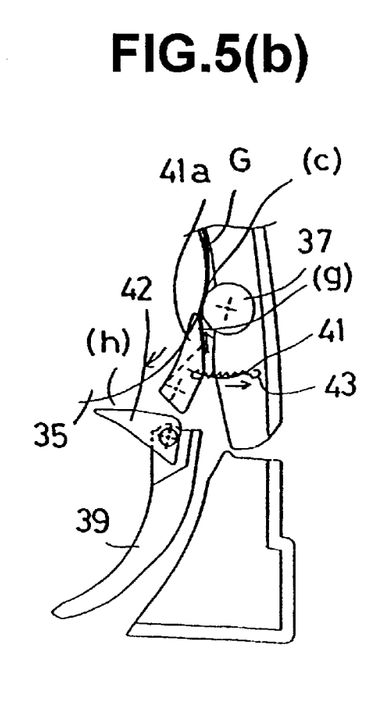
Figure 5C:
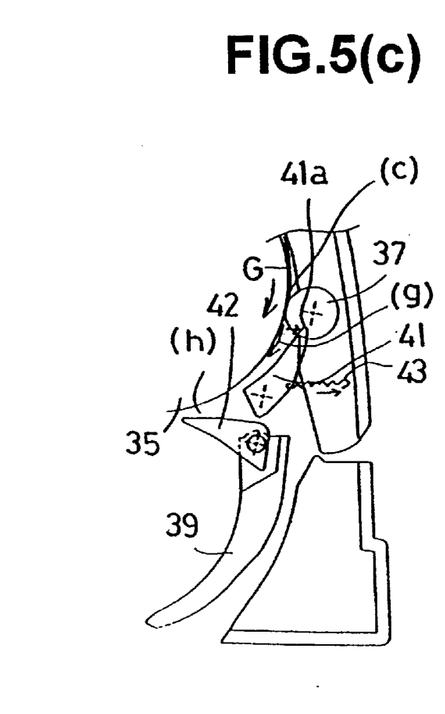

The third flapper 41, for example, is urged in a clockwise direction by a pulling spring 43 as an urging means as shown in FIG. 5. This urging force is a force to such a degree as that the flapper 41 is made rotated in a counterclockwise direction by the pressing force produced by the conveyed original document which presses up the third flapper 41. In this structure, the third flapper 41 stands by in a state shown in FIG. 5(*a*), but, when the original document G is entered, the front end of the original document overcomes the urging force of the flapper 41, thus to render the flapper 41 rotate in a counterclockwise direction resulting in that the original document goes down as it is as shown in FIG. 5(*b*). In this case, the flapper 41 is stopped in a urging state to the original document surface. Then, after the rear end of the original document is passed through the flapper 41 as shown in FIG. 5(*c*), the flapper 41 is returned back to the original position by urging of the spring 43.

In FIG. 5, the third flapper 41 is exemplified, but the second flapper 40 can also have the same structure without solenoids for moving the flapper.

By making the structure above, the time for detecting the rear end of the original document, the time until the solenoid starts moving, or the like becomes unnecessary, and the moving stroke of the flapper becomes minimum, thereby reducing the flapper moving time. Thus, it is possible to reduce the original document reverse-delivery time.

In other words, when the length of the original document is short, the switching back process is to be made on the reverse path. In the flapper with the typical structure, however, the position of such a flapper must be switched for sending the rear end of the original document G to the delivery path P4 (the second conveyance path route) along with the reverse rotation of the reverse roller 35. The third flapper 41 according to the embodiment, on the other hand, is automatically switched to the position where the rear end of the original document G is to be introduced to the delivery path P4 by the urging of the pulling spring 43, after allowing the original document G to pass through from the side of the introduction path P1 as described in FIG. 5, and therefore the original document processing can be carried out promptly with the simple structure.

According to the embodiment where the first flapper 39 and the fourth flapper 42 are structured as an independent body, the first flapper 39 and the fourth flapper 42 are so controlled as to rotate in the same direction at all time. Therefore, these two pieces of the flapper 39 and 42 may be structured as one member when the apparatus layout, the rotation center position or the like can be somewhat changed.

According to the embodiment where the original document processing apparatus is used in the image forming apparatus integrated with the recording apparatus, the original document processing apparatus can also be used in the image reading apparatus having no recording apparatus, such as a scanner or the like.

What is claimed is:

1. An original document processing apparatus for conveying and delivering mounted original documents to a prescribed position comprising:
   a conveyance section for conveying the original document to the prescribed position;
   an original document discharge section for discharging the original document; and
   a reverse-delivery section having a reverse path for looping and reversing the original document conveyed from the conveyance section to return the original document to the conveyance section, a first conveyance path route leading from the conveyance section through the reverse path to the conveyance section, a second conveyance path route leading from a position at midway of the first conveyance path route to the original document discharge section, a third conveyance path route leading from the conveyance section to the original document discharge section, and a first deflection means for selectively introducing the original document conveyed from the conveyance section to the first conveyance path route and the third conveyance path route,
   wherein the original document is delivered to the conveyance section without being switched back if the original document is led to the first conveyance path route and the original document is delivered to the discharge section by being switched back if the original document is led to the second conveyance route.

2. The original document processing apparatus according to claim 1, wherein the reverse path is shorter than the maximum length of the original document able to be processed by the original document processing apparatus.

3. An original document processing apparatus for conveying original documents to a predetermined position comprising:
   a conveyance section for conveying the original document to the predetermined position;
   a discharge section for discharging the original document;
   a reverse path for looping and reversing the original document;
   a first path for leading the original document from said conveyance section to said reverse path;
   a second path for leading the original document being switched back from said reverse path to said discharge section;
   a third path for leading the original from said reverse path to said conveyance section, and for leading the original from said conveyance section to said discharge section.

4. The original document processing apparatus according to claim 3, wherein the reverse path is shorter than the maximum length of the original document able to be processed by the original document processing apparatus.

5. The original document processing apparatus according to claim 3, further comprising a first deflection means selectively introducing the original document conveyed from the conveyance section to the first path and the third path.

6. The original document processing apparatus according to claim 5, wherein said discharge section has a second deflection means for guiding the original document conveyed from said reverse path to said the third path, and for guiding to discharge the original document conveyed from said second path or third path.

7. The original document processing apparatus according to claim 6, further comprising a third deflection means for guiding the original document conveyed from said first path to said reverse path, and for guiding the original document switched back from said reverse path to said second path, and fourth deflection means moving selectively to one of a position opening the second path and a position closing the second path.

8. The original document processing apparatus according to claim 7, wherein the third deflection means or the second deflection means is pivotally movable with a rotational tip urged by an urging means so that the third deflection means or the second deflection means is to be pivotally moved on pressing of a front end of the original document, only when the original document is conveyed from one side.

9. The original document processing apparatus according to claim 7, wherein the fourth deflection means and the first deflection means are constituted of the same members.

10. An original document processing apparatus for conveying the original documents to a predetermined position comprising:
    a conveyance section for conveying the original document to the predetermined position;
    a discharge section for discharging the original document;
    a reverse path for looping and reversing the original document;
    a first path for leading the original document from said conveyance section to said reverse path;
    a second path for leading the original document being switched back from said reverse path to said discharge section;
    a third path for leading the original document from said reverse path to said conveyance section, and for leading the original document from said conveyance section to said discharge section.
    wherein, in the case that the length of the original document to be conveyed is shorter than that of the reverse path, the original document is switched back on the reverse path, to be conveyed through the second path to said discharge section, and, in the case that the length of the original document to be conveyed is longer than that of the reverse path, the original document is returned on first path, reverse path, and third path to the conveyance section and then conveyed through the third path to the discharge section.

11. The original document processing apparatus according to claim 10, wherein said second path is shorter than said reverse path.

12. The original document processing apparatus according to claim 10, further comprising a deflection means selectively introducing the original documents conveyed from the conveyance section to the first path or the third path.

13. An original document processing apparatus for conveying and delivering the mounted original documents to a prescribed position comprising:
- a conveyance section for conveying the original document to the prescribed position;
- an original document delivery section for delivering the original document; and
- a reverse-delivery section having an introduction path for introducing the original document conveyed from the conveyance section, a reverse path for looping and reversing the original document passed through the introduction path, a delivery path for connecting between the conveyance section and the original document delivery section, a conveyance path leading from a position at midway of the reverse path to the original document discharge section, and a first deflection means for selectively introducing the original document conveyed from the conveyance section to the introduction path or the delivery path.

14. The original document processing apparatus according to claim 13, wherein the reverse path is shorter than that of the maximum length of the original document able to be processed in the original document processing apparatus.

15. An image forming apparatus for reading images of an original document to form the images on a sheet, the image forming apparatus comprising:
- an original document processing apparatus having a conveyance section for conveying the original document to a prescribed position, an original document delivery section for delivering the original document, and a reverse-delivery section having a reverse path looping and reversing the original document conveyed from the conveyance section to return the document to the conveyance section, a first conveyance path route leading from the conveyance section through the reverse path to the conveyance section, a second conveyance path route leading from a position at midway of the first conveyance path route to the original document discharge section, a third conveyance path route leading from the conveyance section to the original document delivery section, and a first deflection means for selectively introducing the original documents conveyed from the conveyance section to the first conveyance route or to the third conveyance path route;
- wherein the original document is delivered to the conveyance section without being switched back if the original document is led to the first conveyance path route and the original document is delivered to the discharge section by being switched back if the original document is led to the second conveyance route;
- a reading apparatus for reading the original document conveyed by the original document processing apparatus; and
- a recording apparatus for forming images on the sheet according to information read by the reading apparatus.

16. The original document processing apparatus according to claim 15, wherein the reverse path is shorter than that of the maximum length of the original documents able to be processed by the original document processing apparatus.

17. An image forming apparatus for reading images of the original document to form the images on a sheet, the image forming apparatus comprising:
- a conveyance section for conveying the original document to the predetermined position;
- a reading means for reading images of the original document at the predetermined position conveyed by said conveyance section;
- a discharge section for discharging the original document;
- a reverse path for looping and reversing the original document;
- a first path for leading the original document from said conveyance section to said reverse path;
- a second path for leading the original document being switched back from said reverse path to said discharge section;
- a third path for leading the original from said reverse path to said conveyance section, and for leading the original from said conveyance section to said discharge section; and
- an image forming means for forming the images on sheets according to the information of the images read by said reading means.

18. The image forming apparatus according to claim 17, wherein the reverse path is shorter than that of the maximum length of the original document able to be processed by the original document processing apparatus.

19. An original document processing apparatus comprising:
- a conveying means for conveying original documents to a predetermined position;
- a reverse path for looping the original documents in a first direction from the predetermined position to guide the original documents back to the predetermined position;
- a discharge section disposed on the way of the reverse path for discharging the original documents;
- a first guide means which guides the original documents to said reverse path to be looped in the first direction or second direction opposed to said first direction; and
- a second guide means which guides the original documents to said discharge section in case that the original documents looped on said reverse path in said first direction is switched back,
- wherein the original document is discharged from said discharge section in case that the original document looped on said reverse path in said first direction is switched back and guided by said second guide means, and in case that the original documents is guided by the first guide member to the said reverse path to be looped in the second direction.

20. The original document processing apparatus according to claim 19, further comprising an image reading means for reading the image of original document conveyed to said predetermined position by said conveying means.

21. The original document processing apparatus according to claim 20, further comprising an image forming means for forming an image on a sheet according to the information of the images read by said image reading means.

22. The original document processing apparatus according to claim 19, wherein said reverse path is shorter than the length of the longest original document able to be processed by the original document processing apparatus.

23. The original document processing apparatus according to claim 19, wherein a first original document having a first length is discharged from said discharge section in a case where the first original document looped on said reverse path in said first direction is switched back and guided by said second guide means.

24. The original document processing apparatus according to claim 23, wherein a second original document having a second length, longer than said first length, is discharged from said discharge section in a case where the second original document is guided by said first guide member to the said reverse path to be looped in the second direction.

* * * * *

UNITED STATES PATENT AND TRADEMARK OFFICE
CERTIFICATE OF CORRECTION

PATENT NO. : 6,459,879 B1
DATED : October 1, 2002
INVENTOR(S) : Haruo Naruse

It is certified that error appears in the above-identified patent and that said Letters Patent is hereby corrected as shown below:

Column 2,
Line 24, "sent" should read -- being sent --; and
Line 32, "Other" should read -- Another --.

Column 3,
Line 62, "the third" should read -- the operation of the --.

Column 4,
Line 57, "after" should read -- after being --.

Column 5,
Line 4, "a" should read -- an --;
Line 10, "a" should read -- such a --;
Line 37, "made" should be deleted;
Line 58, "read" should read -- being read --; and
Line 62, "made" should be deleted.

Column 6,
Line 6, "delivery" should read -- deliver --;
Line 7, "read." should read -- being read --; and
Line 14, "in" should be deleted.

Column 7,
Line 54, "show" should read -- shown --.

Column 8,
Line 15, "read" should read -- being read --; and
Line 25, "the reading" should read -- reading of --.

Column 9,
Line 28, "provide" should read -- is provided --.

UNITED STATES PATENT AND TRADEMARK OFFICE
CERTIFICATE OF CORRECTION

PATENT NO.     : 6,459,879 B1
DATED          : October 1, 2002
INVENTOR(S)    : Haruo Naruse It is certified that error appears in the above-identified patent and that said Letters Patent is hereby corrected as shown below:

<u>Column 14,</u>
Line 42, "is" should read -- are --; and
Line 47, "documents is" should read -- document is --.

Signed and Sealed this

Fourteenth Day of October, 2003

JAMES E. ROGAN
*Director of the United States Patent and Trademark Office*